(12) United States Patent
Yajima et al.

(10) Patent No.: US 12,212,143 B2
(45) Date of Patent: Jan. 28, 2025

(54) COMMUNICATION TERMINAL DEVICE

(71) Applicant: AMATERZ, INC., Tokyo (JP)

(72) Inventors: Masakazu Yajima, Tokyo (JP); Tamotsu Kiyakawauchi, Tokyo (JP); Yoshiyuki Sekiguchi, Tokyo (JP); Keita Otsuka, Tokyo (JP); Teruko Nakajima, Tokyo (JP)

(73) Assignee: AMATERZ, INC., Tokyo (JP)

( * ) Notice: Subject to any disclaimer, the term of this patent is extended or adjusted under 35 U.S.C. 154(b) by 0 days.

(21) Appl. No.: 18/023,475

(22) PCT Filed: Aug. 30, 2021

(86) PCT No.: PCT/JP2021/031808
§ 371 (c)(1),
(2) Date: Feb. 27, 2023

(87) PCT Pub. No.: WO2022/045338
PCT Pub. Date: Mar. 3, 2022

(65) Prior Publication Data
US 2023/0318302 A1 Oct. 5, 2023

(30) Foreign Application Priority Data
Aug. 28, 2020 (JP) .................................. 2020-144664

(51) Int. Cl.
*H02J 3/38* (2006.01)
*H04B 1/02* (2006.01)

(52) U.S. Cl.
CPC ................. *H02J 3/38* (2013.01); *H04B 1/02* (2013.01); *H02J 2300/22* (2020.01)

(58) Field of Classification Search
CPC ............ H02J 3/38; H02J 2300/22; H04B 1/02
See application file for complete search history.

(56) References Cited

U.S. PATENT DOCUMENTS

| | | | |
|---|---|---|---|
| 2018/0136712 A1 | 5/2018 | Niikura et al. | |
| 2018/0167090 A1* | 6/2018 | Ishimi | G07C 9/00 |
| 2018/0279582 A1 | 10/2018 | Yajima et al. | |
| 2020/0060240 A1* | 2/2020 | Yajima | A01K 13/00 |
| 2022/0400519 A1* | 12/2022 | Matsuda | H04W 74/0833 |
| 2023/0109546 A1* | 4/2023 | Yonemaru | H01G 11/60 |
| | | | 429/324 |

FOREIGN PATENT DOCUMENTS

| | | |
|---|---|---|
| JP | 2012-248762 A | 12/2012 |
| WO | WO 2016/181604 A1 | 11/2016 |
| WO | WO 2016/203702 A1 | 12/2016 |

* cited by examiner

*Primary Examiner* — Metasebia T Retebo
(74) *Attorney, Agent, or Firm* — Birch, Stewart, Kolasch & Birch, LLP

(57) ABSTRACT

A communication terminal device 100 comprises a first power generator 101, a second power generator 102 whose power generation principle is different from the first power generator, a sensor 103 for sensing information, a first communication unit 104 for sending the information using electric power supplied from the first power generator, a second communication unit 105 for sending the information using electric power supplied from the second power generator, the second communication unit uses a communication scheme different from the first communication unit.

11 Claims, 11 Drawing Sheets

*FIG.11*

| MODULE | TRANSMISSION COUNTER VALUE n | CUMULATIVE VALUE b(n) | INFORMATION VALUE a(n) |
|---|---|---|---|
| 1 | 1 | 20 | 20 |
| 2 | 2 | 35 | 15 |
| 2 | 3 | 40 | 5 |
| 1 | 4 | 52 | 12 |
| 2 | 5 | 67 | 15 |
| 2 | 6 | 73 | 6 |
| 1 | 7 | 80 | 7 |
| 1 | 8 | 93 | 13 |

COMMUNICATION TERMINAL DEVICE

CROSS REFERENCE TO RELATED APPLICATIONS

The present application is based on and claims the benefit of priority from Japanese Patent Application No. 2020-144664 filed on Aug. 28, 2020, the disclosure of which is incorporated herein by reference.

TECHNICAL FIELD

The present invention relates to a communication terminal device for sending various information obtained by sensors without replacing batteries.

BACKGROUND

In recent years, various objects have been able to connect to network such as Internet via communication means. It makes possible to control objects as well as monitor a status of the objects or send/receive information between the objects from afar. Many of these objects have features which are located far away or out of reach and send/receive small amount of data over long period of time. Therefore, these features require a technique of not replacing a battery to operate the objects.

One of techniques to solve this problem is an energy harvesting technique which converts natural energy or small energy in surrounding environments into electric power. For example, there is a solar battery using sunlight, a vibration power generation using vibration, or radio wave power generation using radio wave. A generating device using these energy harvesting techniques can generate electric power by itself and supply electric power necessary for communications, and thus it is not necessary to replace or recharge a battery.

Patent Literatures 1 and 2 disclose sensor devices which are attached to farm animals and send power generation information depending on a type of a power generator. Patent Literature 3 discloses an electronic machine which can be attached to humans or animals, and which sends a module identifier and time information when the module comprising a power generator and a transmitter is powered on.

PRIOR ART LITERATURE

Patent Literature

Patent Literature 1: WO2016/181604
Patent Literature 2: WO2016/181605
Patent Literature 3: JP2015-109009A

SUMMARY OF THE INVENTION

Power generators in these Patent Literatures will not be able to generate electric power when a surrounding environment is changed because they collect very small energy existing in the surrounding environment. For example, in case of a solar battery, it can generate electric power during daytime being capable of using sunlight and cannot generate electric power during nighttime. These Patent Literatures also describe communication units, however, there are no description about a relationship between the usage environment and the communication units. In general, a communication device capable of long-distance communication consumes much power. This causes a problem that the communication unit can neither operate nor send information if the consumed electric power is not enough for the power generator. This problem is remarkable when the device is attached to any objects to be moved since its surrounding environment and communication environment will be changed.

It is an object of the present invention to realize a communication terminal device capable of decreasing a period during which information cannot be sent and eliminating the need for replacing a battery.

According to the disclosure, a communication terminal device (100) of an embodiment comprises: a first power generator (101); a second power generator (102) whose power generation principle is different from the first power generator; a sensor (103) for sensing information; a first communication unit (104) for sending the information using electric power supplied from the first power generator; and a second communication unit (105) for sending the information using electric power supplied from the second power generator, the second communication unit using a communication scheme different from the first communication unit.

The numbers in parentheses attached to the claim elements of the present disclosure described in this section and claims indicate the relationship between the present invention and the embodiments described below, and are not intended to limit the present invention.

Advantageous Effects of Inventions

According to the communication terminal device of the present invention, it can decrease a period during which information cannot be sent and can eliminate the need for replacing a battery by comprising a plurality of modules in which different power generators and different communication units are combined. Furthermore, it can further decrease the period during which information cannot be sent because of lack of electric power or change of the communication environment by combining modules depending on a feature of attached objects.

BRIEF DESCRIPTION OF THE DRAWINGS

FIG. 11 is a diagram illustrating a mechanism of exclusive control of the communication terminal device in the fourth embodiment.

DETAILED DESCRIPTION

Embodiments of the present invention will now be described with reference to the drawings.

Note that the present invention indicates any inventions in claims and not limited to the embodiments below. Further, at least words within the double quotation means words and phrases described in the claims and is not limited to the following embodiments.

Configurations and methods described in dependent claims of claims should be interpreted as arbitrary configurations and arbitrary methods in the invention of independent claims. Configurations and methods of following embodiments corresponding to configurations and methods described in dependent claims, and configurations and methods described only in the following embodiments without descriptions in claims should be interpreted as arbitrary configurations and arbitrary methods in the present invention. In a case that the scope of claims is broader than descriptions of the embodiments, configurations and methods described in the following embodiments are just examples of configurations and methods of the present invention, which should be interpreted as arbitrary configurations and arbitrary methods in the present invention. In any cases, essential configurations and methods of the present invention should be interpreted based on independent claims.

Any effects described in embodiments are effects obtained when a configuration of an embodiment as an example of this disclosure and are not necessarily an effect of the present invention.

When there are a plurality of embodiments, the configuration disclosed in each embodiment is not limited to each embodiment alone, and may be combined across the embodiments. For example, the configuration disclosed in one embodiment may be combined with another embodiment. Further, the disclosed configurations may be collected and combined in each of the plurality of embodiments.

The problem described in this disclosure is not a publicly known problem, but person including the inventor has independently found out, and is a fact that affirms the inventive step of the invention together with the configuration and method of the present disclosure.

1. Overall Configuration Common to Each of the Configurations

Figure 1:
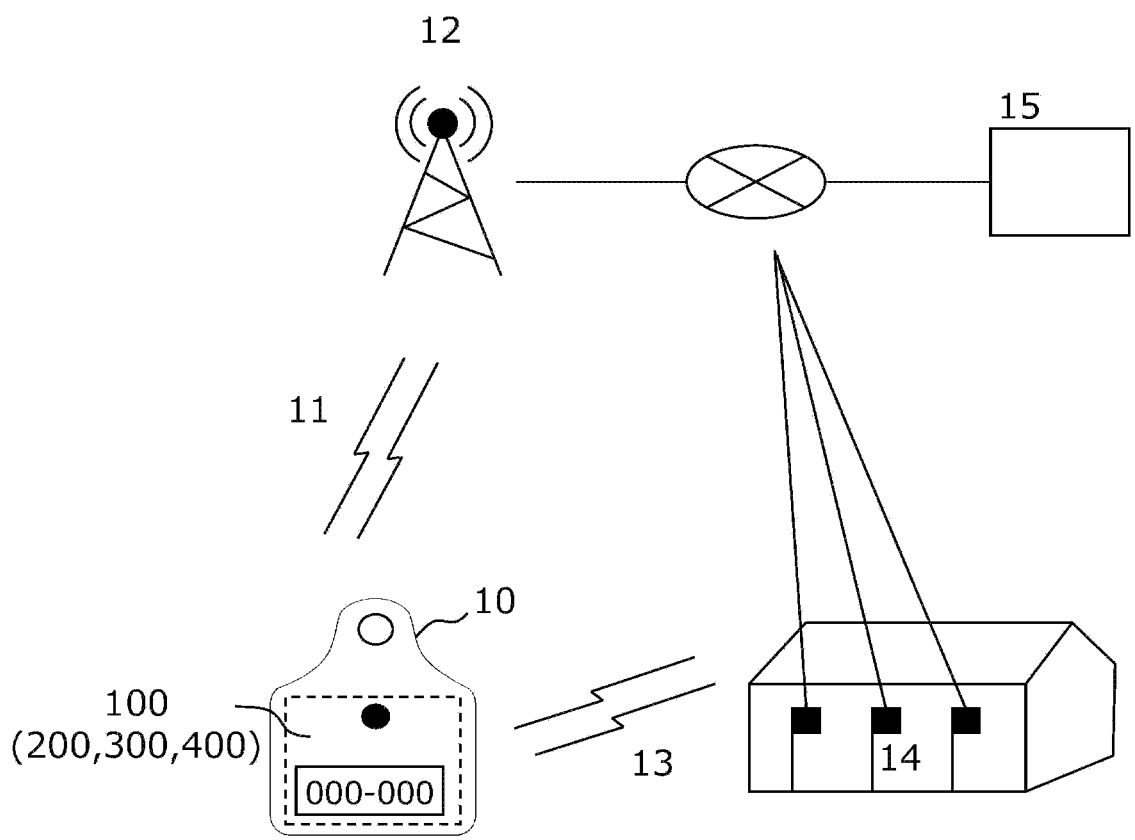
FIG. 1 is a diagram illustrating an overall configuration common to each of embodiments.

An overall configuration common to main embodiments will be described with reference to FIG. 1. A communication terminal device 100, a communication terminal device 200, a communication terminal device 300, and a communication terminal device 400 (hereinafter referred to as the communication terminal device 100 etc.) in the main embodiments are hold on earmarks 10 of farm animals. The communication terminal device 100 etc. is attached to ears of farm animals such as cattle using the earmark 10. The communication terminal device 100 etc. comprises various sensors which sense information. The sensed information is sent to an analysis device 15 from the communication terminal device 100 etc. via a base station 12 and internet network 11 using a cellular network communication. The sensed information is also sent to the analysis device 15 from the communication terminal device 100 etc. via a base unit 14 placed at a cattle barn and internet network using short-range wireless communication. A communication scheme of the communication terminal device 100 etc. and power supply combined with the scheme will be described in each of the embodiments. The analysis device 15 analyses the received information and sends necessary information to people concerned. The analysis device 15 itself may control the communication terminal device 100 etc. or any other equipment if necessary.

By adopting such configuration enables to monitor surrounding environments and ecological situations of farm animals, and to manage farm animals all the time.

In the embodiments below, the communication terminal device 100 etc. is attached to the farm animals, however, may be attached to any other objects. For example, the device may be attached to or incorporated into a person or his belongings. Instead of the above, the device may be attached to or incorporated into moving bodies such as automobiles, two-wheeled vehicles, trains, ships, and airplanes, or any objects to be loaded on these bodies.

2. First Embodiment

(1) Configuration of Communication Terminal Device

A configuration of a communication terminal device 100 of the present embodiment will be described with reference to FIG. 2. The communication terminal device 100 comprises a first power generator 101, a second power generator 102, a sensor 103, a first communication unit 104, a second communication unit 105, a first power storage 106, and a second power storage 107.

The first power generator 101 is a power generation element having a predetermined power generation principle. Preferably, it may be a solar battery having a power generation principle using light. For example, it may be a solar battery having a power generation principle in which sunlight is received and converted into electric power. For example, it may be a solar battery having a power generation principle based on a p-n junction diode having a combined structure of a p-type semiconductor and a n-type semiconductor. Specifically, silicon or chemical compound solar battery may be used. In the present embodiment, a case in which silicon or chemical compound solar battery is used is described as an example.

The second power generator 102 is a power generator which has "different power generation principle" from the first power generator 101. Preferably, a power generation principle other than using light may be used. For example, one of vibration power generation, heat (temperature difference) power generation, radio wave power generation including distant magnetic field or neighbor magnetic field, or bio-power generation may be used. The present embodiment describes vibration power generation as an example. A dye-sensitized solar battery may be used as the second power generator 102, however, this will be described in the second embodiment.

The vibration power generation has a power generation principle in which vibration energy is converted into electric power. Specifically, it may be a power generation principle using piezoelectric power generation using piezoelectric ceramics, movable magnet power generation using electromagnetic induction by movement of magnet of coil, or permanent charge power generation using move of an electrode plate into which electric charge is absorbed and like, but not limited to those. The second power generator 102 having the power generation principle of vibration power generation converts movement of cattle being farm animals into electric power in this embodiment. The voltage output by the vibration power generation is usually alternating current, therefore, a rectifier circuit for converting AC voltage to DC voltage may be provided at a later stage of the second power generator 102.

Here, "different power generation principle" include a case in which input energy is the same but electric generation processes are different as well as a case in which the input energy is different. For example, power generation principles may be different if materials or crystal structure are different.

The sensor 103 is an element for sensing "information". The sensor 103 can properly select a sensor for obtaining necessary information. For example, a thermos sensor for measuring temperature and a humidity sensor for measuring humidity may be used as sensors for monitoring surrounding environment of the farm animals. Also, a thermos sensor for measuring body temperature of farm animals, a pulse sensor for measuring a pulse, an acceleration sensor, a gyro sensor or a geomagnetic sensor and the like for sensing movement of farm animals may be used as sensors for estimating ecological situation of farm animals. Any other sensors such as a GPS, a gas concentration sensor, a human sensor, a brightness sensor, a sweating sensor, a metabolic sensor, a heartbeat sensor and like may be used if necessary. The sensor 103 may receive information from an external sensor instead of operating as a sensor. For example, the sensor may be an interface for receiving information. The sensor 103 in each of the embodiments is described as a sensor for sensing information, however, the wording: information value is used when emphasizing to sense and obtain information from values.

Here, the "information" includes raw information output from sensors as well as information generated by converting the raw information.

The first communication unit 104 sends information sensed by the sensor 103 from an antenna using electric power supplied from the first power generator 101. Preferably, the first communication unit 104 performs communications using a communication scheme capable of long-distance communication more than the second communication unit 105 below. For example, it may perform LPWA (Low Power Wide Area) communication which is a communication scheme consuming less electric power and capable of long-distance communication. Examples of LPWA include, but are not limited to, eMTC (enhanced Machine Type Communication) proposed by 3GPP (Third Generation Partnership Project), NB-loT (Narrow Band Internet of Things) optimized to perform small data communication, SIGFOX™ developed by Sigfox, or LoRa™ developed by Semtech. It may also be a communication scheme using a relay station between a base station and a GW (Gate Way). Other examples of the first communication unit 104 may be a communication scheme such as Wi-Fi™, the third-generation mobile communication (3G), the fourth-generation mobile communication (4G), the fifth-generation mobile communication (5G).

The second communication unit 105 sends information sensed by the sensor 103 from an antenna using electric power supplied from the second power generator 102. The second communication unit 105 performs communication using a "different communication scheme" from the first communication unit 104. Preferably, the second communication unit 105 uses short-range wireless communications such as Bluetooth™ or BLE (Bluetooth Low Energy). Other examples of short-range wireless communications are, for example, RFID™, DSRC, Felica™, infrared communication, NFC, specified lower power wireless communication, extremely low power wireless communication, UWB, or ZigBee™.

Here, "different communication scheme" includes a case in which a version, a mode, or a specification is different in the same standard as well as a case in which different standards are used.

The first power storage 106 stores electric power generated by the first power generator 101. The second power storage 107 stores electric power generated by the second power generator 102. Both power storages can complement the electric power when each of power generators cannot supply electric power to make the operation of the communication terminal device 100 stable. The first power storage 106 and the second power storage 107 are not necessarily to be provided in the present embodiment.

Only one of the first power storage 106 and the second power storage 107 may be provided. For example, only the power storage 106 may be provided when a solar battery which can generate electric power in a limited time zone is used as the first power generator 101. When cattle move to a cattle barn during a time around sunset under weak sunlight, the first communication unit 104 can continue to communicate using electric power supplied from the power storage 106 by providing the power storage 106 until the cattle reach to an area of a communication range of the second communication unit 105.

In the present embodiment, a first module comprising the first power generator 101 and the first communication unit 104 and a second module comprising the second power generator 102 and the second communication unit 105 are independent from each other. It means that the first communication unit 104 does not use electric power supplied from the second power generator 102. Also, the second communication unit 105 does not use electric power supplied from the first power generator 101. However, it is not necessary for the first module and the second module to be independent from each other. For example, the first power generator 101 may supply electric power to the second communication unit 105, or the second power generator 102 may supply electric power to the first communication unit 104. A power storage common to the first power generator 101 and second power generator 102 may be provided to supply electric power to the first communication unit 104 and second communication unit 105.

In the present embodiment, there are two independent modules, one has the first power generator 101 and the first communication unit 104, the other has the second power generator 102 and the second communication unit 105, however, there may be three or more modules. For example, a radio wave power generator as a third power generator or an active RFID as a third communication unit may be used. Other power generator having any other power generation principle may be combined if the radio wave power generator cannot supply enough electric power. NFC (Near Field Communication) such as Felica™ may be used as a third module, however, a mechanism itself for supplying electric power via NFC antenna corresponds to the third power generator. In other examples, a thermal power generation may be provided as the third power generator. When it is equipped on a movable body, it will be possible to perform optimal communication scheme depending on the environment by modules each having sunlight, vibration, and heat power generation. For example, it performs long-distance communication by sunlight when it is inside, performs short-distance communication by vibration when it is outside, and when it is inside and the vibration is going to stop, a communication by heat power generation will be increased accompanied with a decrease of vibration, and afterwards it shifts the heat power generation to the operation mode using a storage battery if the thermal storage of the movable body is exhausted.

(2) The Form and Arrangement of the Communication Terminal Device

Figure 3A:
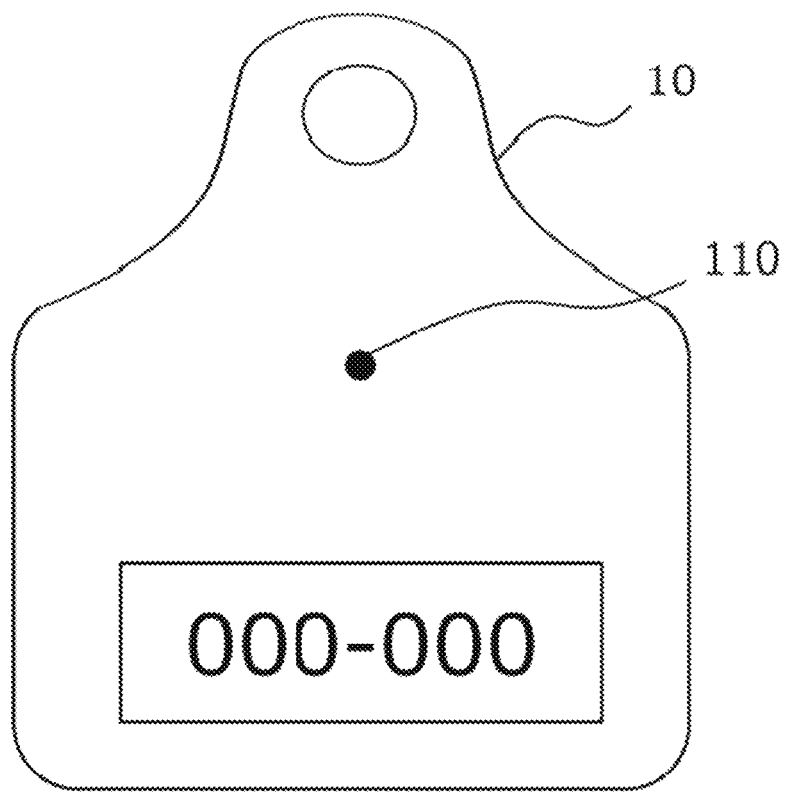
FIG. 3 is a diagram illustrating a front surface (FIG. 3a) and a back surface (FIG. 3b) of an earmark holding the communication terminal device of each of the embodiments.
Figure 3B:
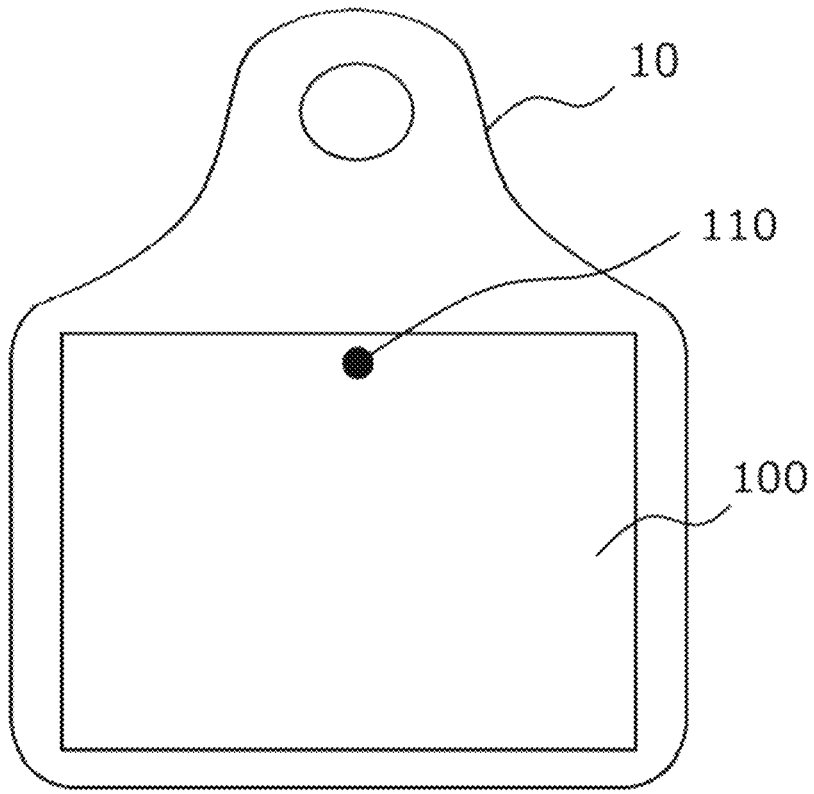

A first form and arrangement of the communication terminal device 100 of the present embodiment will be described with reference to FIG. 3 and FIG. 4. An earmark 10 is used to indicate individual identification number being an original function, also used to hold and attach the communication terminal device 100 to animals such as farm animals. FIG. 3*a* illustrates a diagram of the earmark 10 seen from a front surface. Individual identification number is described on the front surface of the earmark 10. FIG. 3*b* illustrates a diagram of the earmark 10 seen from a back surface. The communication terminal device 100 is loosely attached to the back surface of the earmark 10 using a support bracket 110 piercing the earmark 10 to avoid concealing the individual identification number on the earmark 10.

Figure 4A:
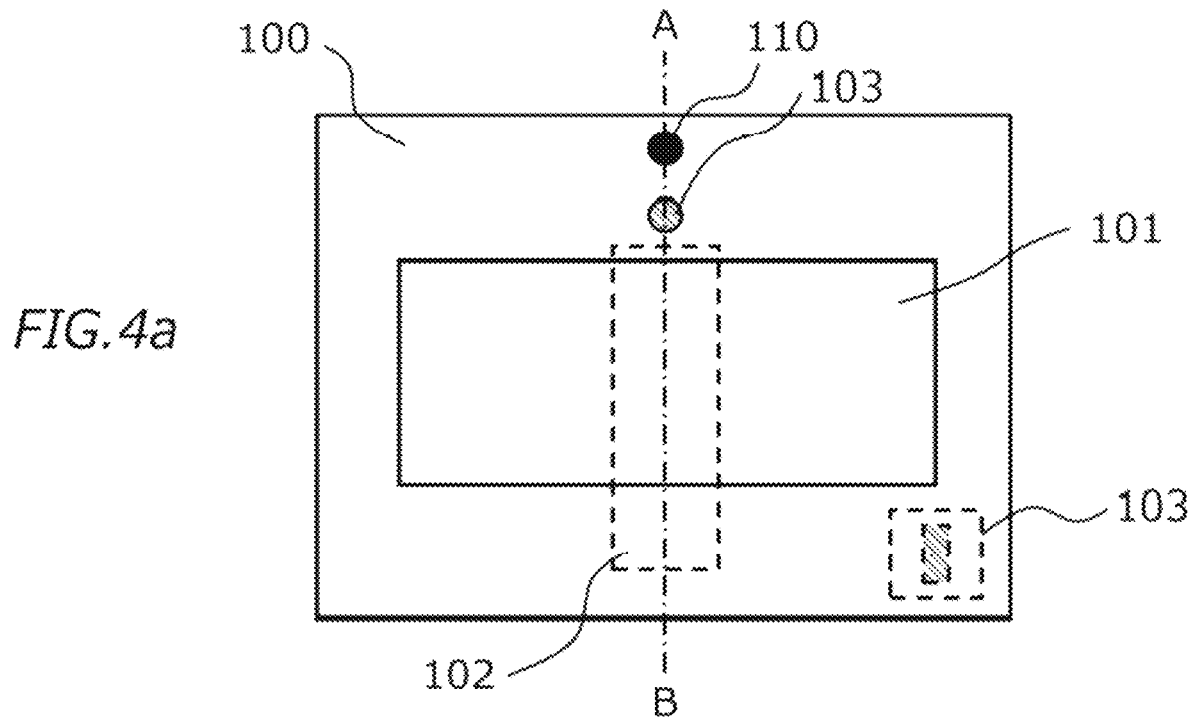
FIG. 4 is a diagram illustrating a front surface (FIG. 4a) and a cross section (FIG. 4b) of the communication terminal device of each of the embodiment.
Figure 4B:
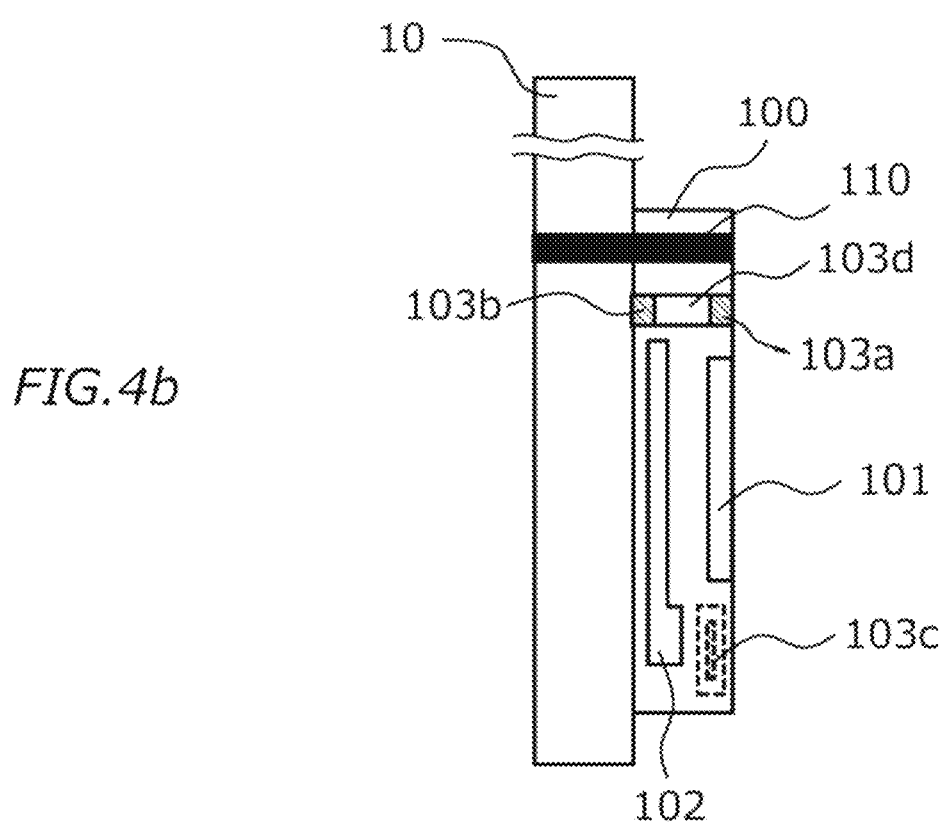

FIG. 4*a* illustrates a front view of the communication terminal device 100 seen from the back surface of the earmark 10, and FIG. 4*b* illustrates a sectional view of the communication terminal device 100 cut by a broken line A-B in FIG. 4*a*. However, a thermistor 103*c* can been exceptionally seen in this figure. A solar battery being the first power generator 101 is located so that a light receiving panel is provided on the front surface of the communication terminal device 100. Providing the solar battery on such a location enables to receive sunlight without being affected by the earmark 10.

A vibration power generator being the second power generator 102 is located inside the communication terminal device 100 so that a direction from a side close to the support bracket 110 to the opposite side of the vicinity of the support bracket 110 corresponds to its longitudinal axis. The vibration power generator has a form or material that makes a side farther from the support bracket 110 heavier. The vibration power generator can efficiently sense vibration of the communication terminal device 100 by adopting such form and material. The communication terminal device 100 vibrates with the support bracket 110 as a fulcrum when farm animals move. Providing the vibration power generator on this direction enables the vibration power generator to sense vibration efficiently by synchronizing with the vibration direction of the communication terminal device 100. The vibration of the communication terminal device 100 can be increased by providing weight on a side opposite to a side close to support bracket 110, thus the vibration power generator can sense much more vibration, but it is not shown in figures.

In FIG. 4*b*, a thermistor 103*a*, a thermistor 103*b*, and a thermistor 103*c* are provided as examples of the sensor 103. A thermal conductor 103*d* is also provided between the thermistor 103*a* and the thermistor 103*b*. The thermistor is used as thermos sensor, which is a resistor whose change of electric resistance to change of temperature is big.

The thermistor 103*a* is provided on the front surface of the communication terminal device 100. Since this surface is usually positioned on the body side of farm animals, it can measure body temperature (Ta) of farm animals.

The thermistor 103*b* is provided on the back surface of the communication terminal device 100 to contact to the earmark 10. Therefore, it can measure temperature (Tb) of this part.

The thermal conductor 103*d* is a thermal conductor whose resistance value (R) is known. A heat flux (I) can be derived using the following equation;

$$I=(Tb-Ta)/R$$

Further, the amount of metabolism of farm animals can be obtained from the heat flux (I) using a proportional relation between heat flux (I) and calory (Q).

The thermistor 103*c* is provided in an area inside the communication terminal device 100. This area may be under vacuum or filled with gas such as nitrogen. The thermistor 103*c* can measure outside temperature (Tc) by such a configuration.

As described above, the body temperature and the metabolic rate of farm animals, and outside temperature can be obtained by providing three thermistors and one thermal conductor as the sensor 103.

Figure 5A:
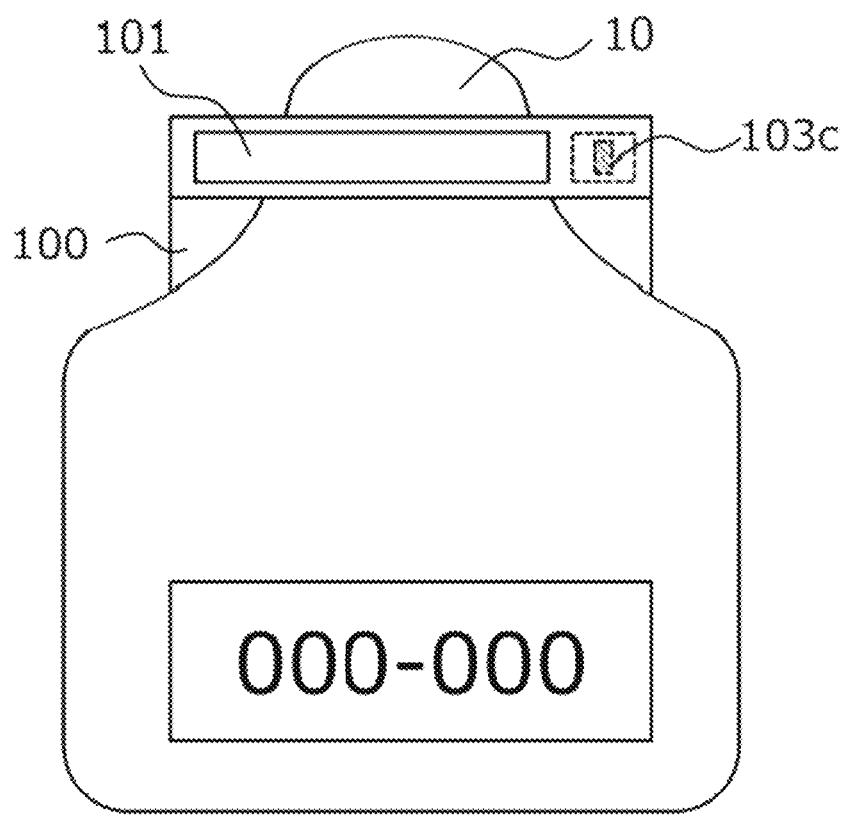
FIG. 5 is a diagram illustrating a front surface (FIG. 5a) and a back surface (FIG. 5b) of the earmark holding the communication terminal device of each of the embodiment.
Figure 5B:
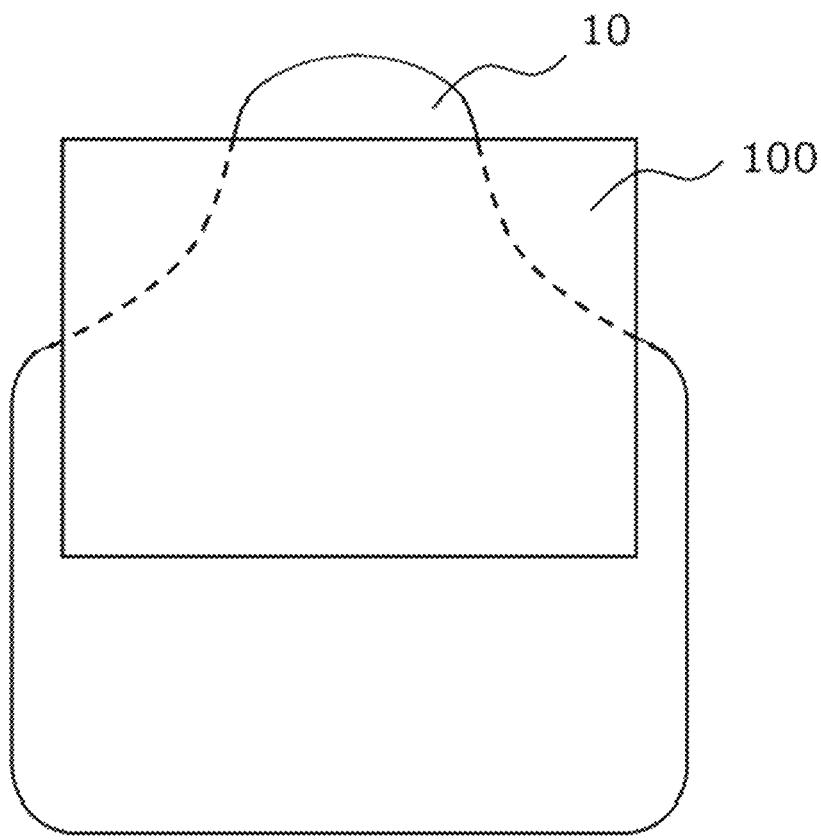

The second form and arrangement of the communication terminal device 100 of the present embodiment will be described with reference to FIGS. 5 and 6. FIG. 5*a* illustrates a diagram of the earmark 10 seen from the front surface. FIG. 5*b* illustrates a diagram of the earmark 10 seen from the back surface. An upper side of the communication terminal device 100 is a belt-shaped clip, the communication terminal device 100 is loosely held to the back surface of the earmark 10 by putting a neck of the earmark 10 between the body of the communication terminal device 100 and the clip.

Figure 6A:
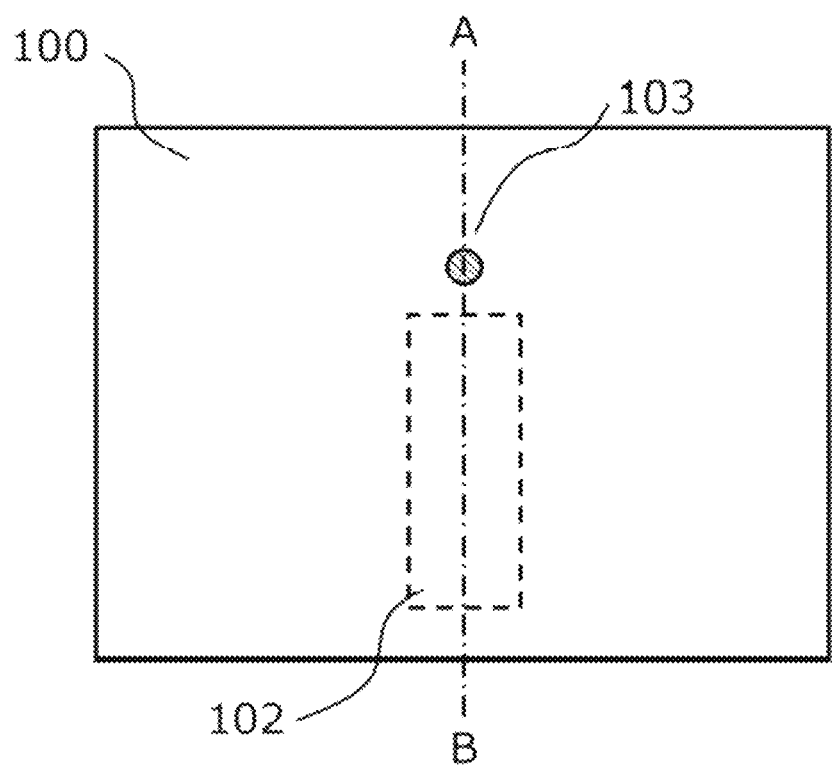
FIG. 6 is a diagram illustrating a front surface (FIG. 6a) and a cross section (FIG. 6b) of the communication terminal device of each of the embodiment.
Figure 6B:
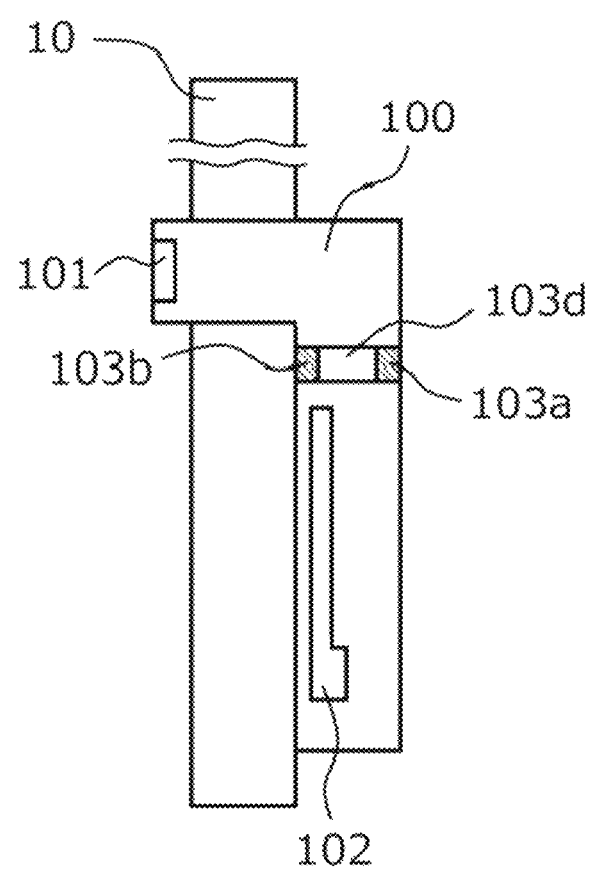

FIG. 6*a* illustrates a front view of the communication terminal device 100 seen from the back surface of the earmark 10, and FIG. 6*b* illustrates a sectional view of the communication terminal device 100 cut by a broken line A-B of FIG. 6*a*. The solar battery being the first power generator 101 is provided so that a light receiving panel is located on the front surface of the clip of the communication terminal device 100. Providing the solar battery on such a location enables to receive sunlight without being affected by the earmark 10.

A vibration power generator being the second power generator 102, a thermistor 103*a*, a thermistor 103*b*, a thermistor 103*c*, and a thermal conductor 103*d* as a sensor 103 are provided in the second form and arrangement like the first form and arrangement of the communication terminal device 100. According to this example, the thermistor 103*c* is provided adjacent to a light receiving panel of the first power generator 101 on the clip of the communication terminal device 100, as shown in FIG. 5*a*.

An example of a thermistor as a thermos sensor is described, however, other thermos sensor may be used or amount of electric power may be monitored using an element which generates electric power using temperature difference. For example, Seebeck element or Peltier element may be used.

The forms and arrangements of communication terminal device 100 are described above, however, those may be used for other embodiments as well as the present embodiment.

(3) Operation of the Communication Terminal Device

Figure 7:
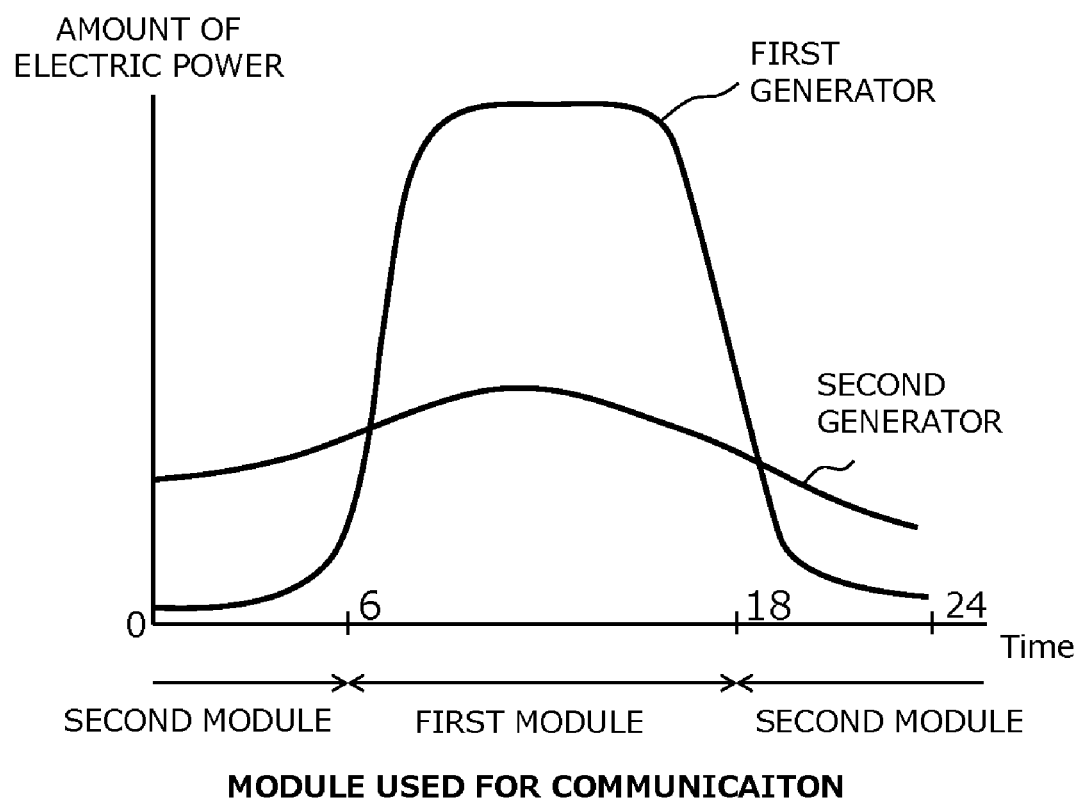
FIG. 7 is a diagram illustrating operations of the communication terminal device in the first embodiment.

An operation of the communication terminal device 100 in the present embodiment will be described with reference to FIG. 7. FIG. 7 illustrates a graph indicating a relationship between an amount of generated electric power and time of the first power generator 101 and the second power generator 102. In the present embodiment, the communication terminal device 100 has a first module and a second module, a solar battery and LPWA are combined in the first module and a vibration power generation and BLE are combined in a second module.

The first module uses the solar battery as the first power generator 101, which can generate enough amount of electric power when it is outdoor and during daytime but not enough when it is indoor or during nighttime. Also, the first module uses LPWA as the first communication unit 104, which can communicate regardless of positions as long as it can communicate with the base station 12. Therefore, the first module can send information sensed by the sensor 103 when it is outdoor and during daytime.

The second module uses the vibration power generation as the second power generator 102, which can generate electric power while cattle being farm animals is active. It can generate much amount of electric power when farm animals are active to be pastured to outdoor during daytime to freely work around and eat grass, while it can generate less amount of electric power when they are constrained in a cattle barn or sleeping. It should be noted that enough electric power for operating the second communication unit 105 is generated. The second module uses BLE as the second communication unit 105, which can communicate with a base unit provided at the cattle barn when farm animals are in the cattle barn, while which cannot communicate with the base unit when farm animals are pastured to outdoor during daytime because the distance between the module and the base unit is far.

In this way, the first module and the second module generate electric power independently and send information. As a result, the first module generates electric power and send information during daytime and outdoors while the second module generates electric power but cannot communicate with the base unit and thus cannot send information. On the other hand, the first module can neither generate electric power nor send information during nighttime or outdoors, while the second module can generate electric power and send information. It will be the same when farm animals stay indoors during daytime under bad weather.

It can send information throughout the day by combining modules depending on the features of objects to which the communication terminal device 100 is attached. In the present embodiment, the modules are selected depending on the features of farm animals, for example, movement pattern, physiological phenomenon, or management method of farm animals, it can send information regardless of time zone, indoor, or outdoor.

(4) Second Power Generator Seen from the Attached Object

The second power generator 102 can properly select power generation principle depending on an attached object. For example, when the attached object is human or animals such as farm animals which have physical movement and temperature, vibration power generation, heat (temperature difference) powered generation, or both may be used. On the other hand, when the attached object is not animals, proper power generation principle can be selected depending on the feature of the object. For example, when the object is an automobile, the vibration power generation and the radio wave power generation may be combined because the automobile may be used and be in a garage during night.

(5) Summary of the First Embodiment

As described above, the modules can be switched depending on the feature of the objects by selecting the first module and the second module depending on the feature of the objects to which the communication terminal device 100 is attached in the present embodiment. Further, when the first module and the second module are independent from each other, it is not necessary to use a switch circuit such as a CPU or microcomputer, which can minimize power consumption.

3. Second Embodiment (1) Configuration of Communication Terminal Device

The first embodiment describes an example in which the vibration power generation is used as a second power generator 102. In the present embodiment, an example in which the second power generator 102 uses a solar battery which is same as the first power generator 101 but the power generation principle is different from the first power generator 101, will be described. The configuration of the communication terminal device 200 of the present embodiment is substantially same as the communication terminal device 100 in the first embodiment, it will be described with reference to FIG. 2.

The first power generator 101 uses silicon or chemical compound solar battery in the present embodiment.

The second power generator 102 has a power generation principle which can generate electric power in a darker surrounding environment than the first power generator 101 as well as generate electric power using light. For example, a dye-sensitized solar battery may be used, the dye-sensitized solar battery being is an organic solar battery which uses organic compound for an absorptive layer.

For example, the dye-sensitized solar battery has a constructure having a glass plate having a transparent conductive layer of indium/tin on a front surface, an electrode in which particles such as titanium dioxide are set on an inner surface of a transparent plastic sheet, the particles on which an organic dye such as ruthenium is adsorbed, a counter electrode such as platinum and carbon, and an oxidation reductant fulfilled between the electrodes.

The dye-sensitized solar battery can decrease the amount of light necessary to start generation because its internal resistance is small to easily flow current. Further, the dye-sensitized solar battery has a high conversion efficiency indoors because it has a higher sensitivity than amorphous silicon in visible light (indoor) area. The dye-sensitized solar battery sensitively responds to light having specific wavelength. For example, it may increase power generation efficiency by setting it to the light wavelength emitted from a fluorescent light and LED. In addition, the dye-sensitized solar battery has less susceptibilities to environmental change and can stably generate electric power because it has less dependency on frequency in visible light area.

(2) Summary of the Second Embodiment

The dye-sensitized solar battery can generate electric power in a darker surrounding environment than a silicon solar battery, and thus it can generate electric power using indoor light. Since it does not need any physical movement of attached object unlike the vibration power generation, it can also be attached to any objects other than animals and moveable body.

4. Third Embodiment

(1) Configuration of Communication Terminal Device

Figure 8:
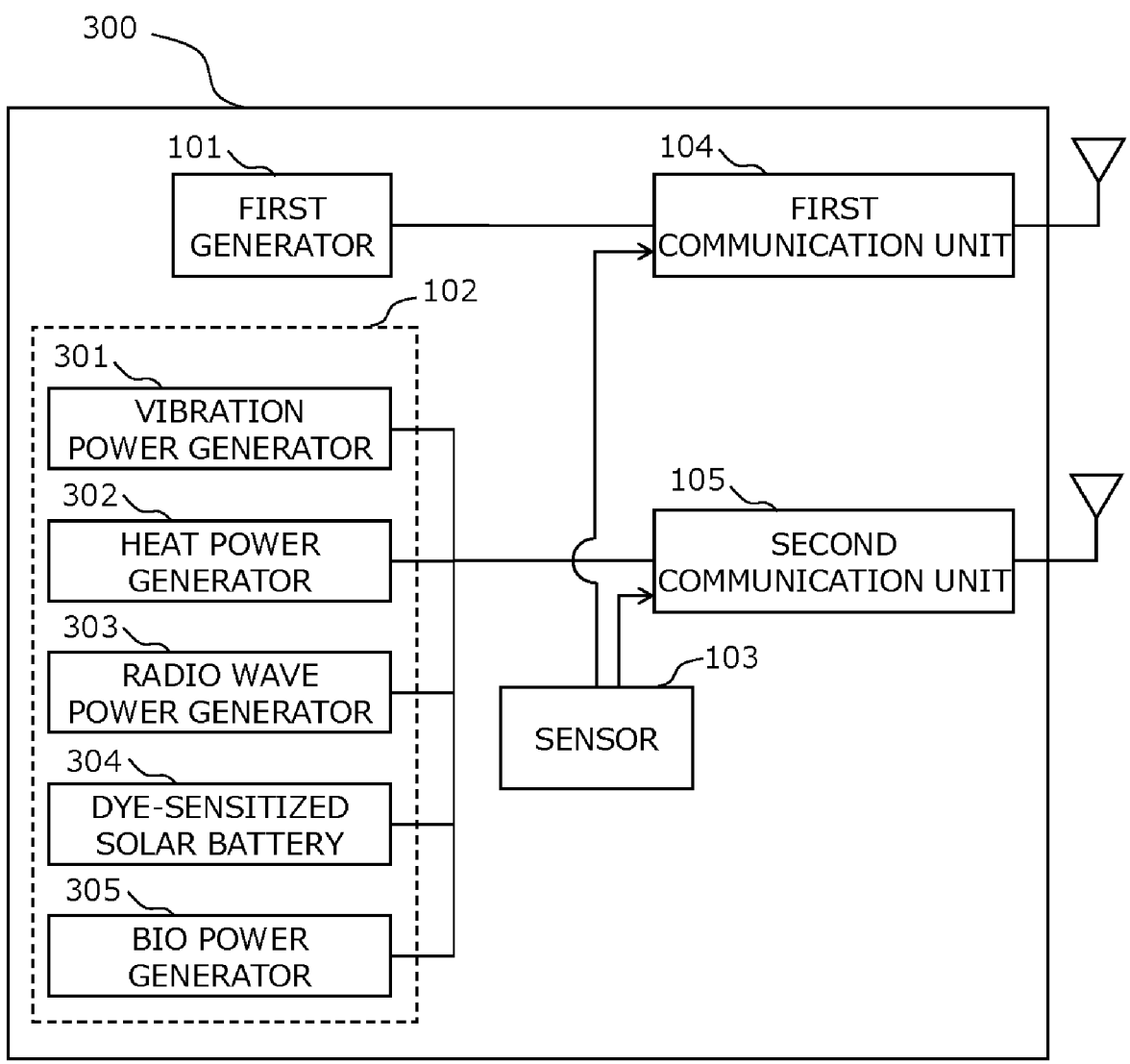
FIG. 8 is a block diagram illustrating a configuration of the communication terminal device in a third embodiment.

The first embodiment and the second embodiment describe examples in which the second power generator 102 uses one power generation principle. This embodiment will describe an example in which the second power generator 102 uses a plurality of power generation principles. A configuration of the communication terminal device 300 of this embodiment will be described with reference to FIG. 8. It should be noted that the same numerical reference will be used and the descriptions for FIG. 2 will be referred for blocks common to FIG. 2.

The first power generator 101 uses silicon or chemical compound solar battery in the present embodiment.

The second power generator 102 has a plurality of power generators. In the present embodiment, the second power generator 102 has a vibration power generator 301, a heat power generator 302, a radio wave power generator 303, a dye-sensitized solar battery 304, and a bio power generator 305, however, it may have at least two of these.

The vibration power generator 301 is same as one described in the first embodiment.

The heat power generator 302 is a thermoelectric transducer having a power generation principle in which temperature difference (heat) is converted into electric power. The heat power generator 302 is, for example, a generator by Seebeck effect or Thomson effect, a thermoelectric power generation element, a thermomagnetic power generation element and like. A method for obtaining temperature difference is, for example, a method in which one electrode is touched to a body surface of cattle being farm animals and another electrode is opened to the air.

The radio wave power generator 303 has an element having a power generation principle in which distant magnetic field or neighbor magnetic field is converted into electric power. For example, it may generate electric power using radio wave for broadcast or communication in the air or radio wave generated by illuminations or home appliances.

The dye-sensitized solar battery 304 is same as the one described in the second embodiment.

The bio power generator 305 is also called as a biological battery, which converts chemical energy into electric energy using biological change of a biocatalyst or microbe such as enzyme, chlorophyll and the like. An example of the bio power generator 305 is a fuel cell biological battery or electrochemical biological battery. The fuel cell biological battery generates electric power, for example, by decomposing a saccharide such as glucose by enzyme and chlorophyll. The electrochemical biological battery generates electric power, for example, by having a principle imitating photosynthesis and irradiating light.

The vibration power generator 301, the heat power generator 302, the radio wave power generator 303, the dye-sensitized solar battery 304, and the bio power generator 305 supply electric power to the second communication unit 105.

(2) Summary of the Third Embodiment

Each of the power generators composing the second power generator 102 can generate fewer electric power than the first power generator but can continuously generate electric power. It may stably supply necessary electric power by providing a plurality of power generators as the second power generator 105. Further, any objects other than animals or movable body can be selected for the object to which the communication terminal device 300 is attached.

5. Fourth Embodiment

(1) Configuration of Communication Terminal Device

In case of the embodiments 1-3, each of the first communication unit 104 and the second communication unit 105 may send information sensed by the sensor when both units are being active. In these cases, the analysis device 15 can identify the received information from each of the communication unit being the same by unique identifier attached to the information. On the other hand, the present embodiment performs exclusive control to control so as not to send the same information from each of the units.

Figure 9:
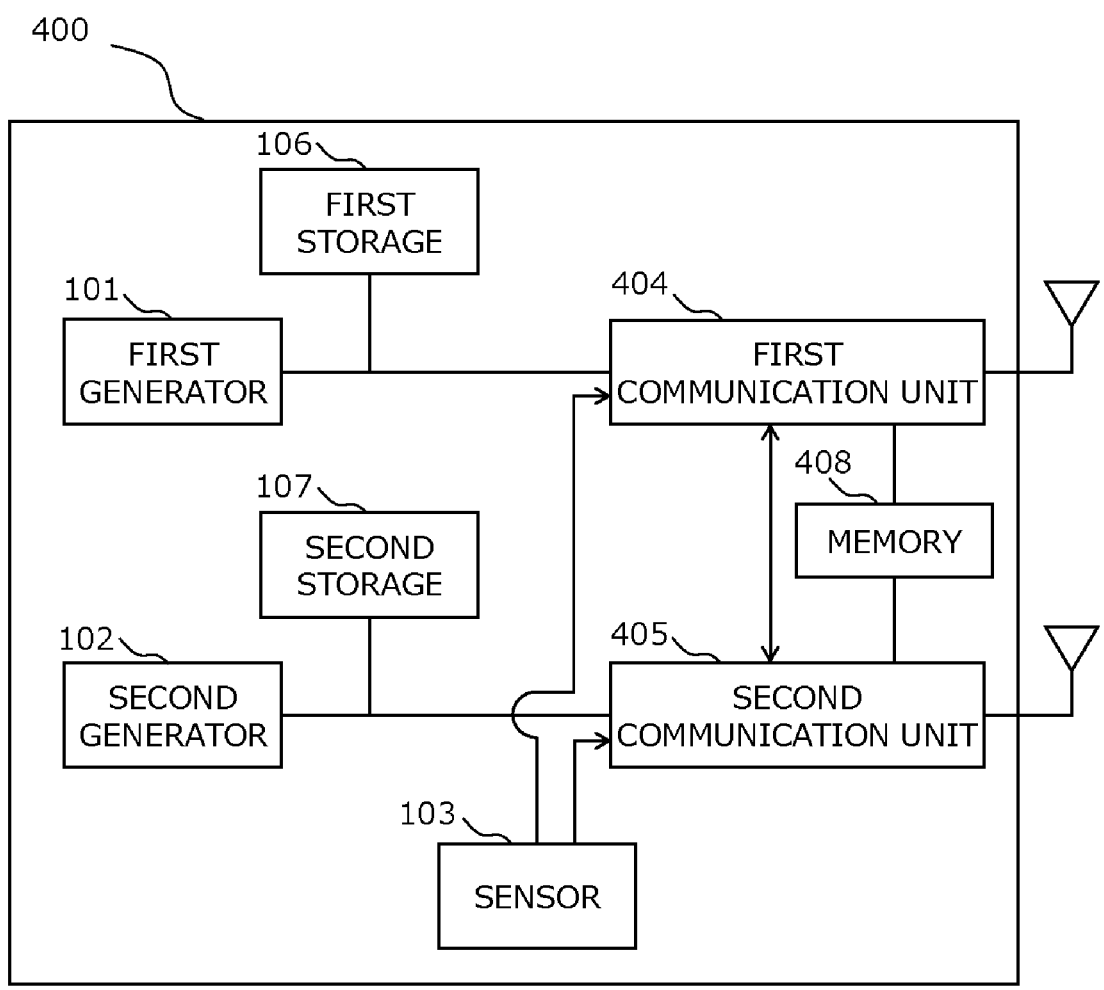
FIG. 9 is a block diagram illustrating a configuration of the communication terminal device in a fourth embodiment.

The configuration of the communication terminal device 400 in the present embodiment will be described with reference to FIG. 9. Performing the exclusive control between the first communication unit 404 and the second communication unit 405 and providing a memory 408 are different from the first embodiment and the second embodiment in FIG. 2. It should be noted that the same numerical reference will be used and the descriptions for FIG. 2 will be referred for blocks common to FIG. 2.

Figure 2:
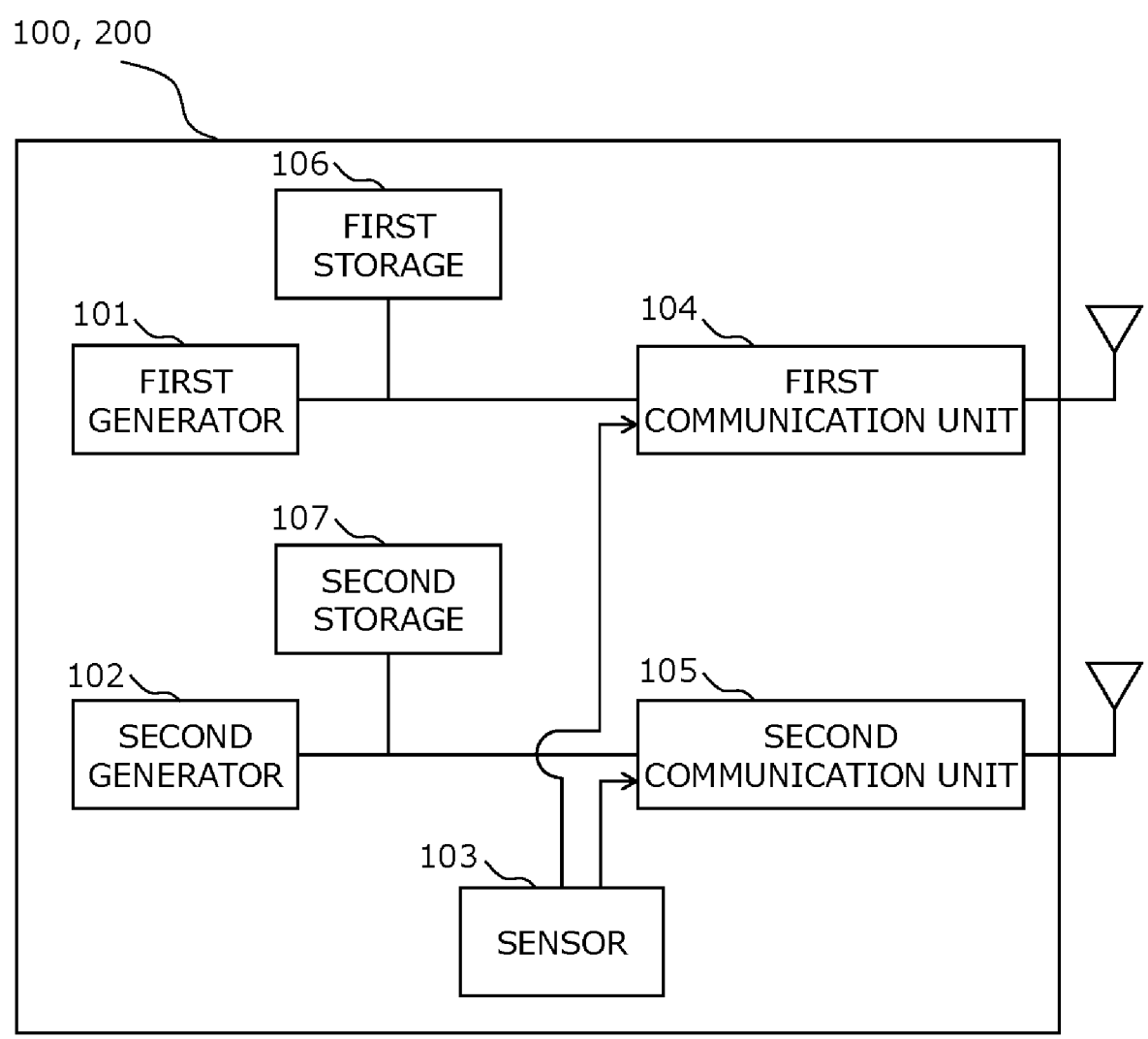
FIG. 2 is a diagram illustrating the communication terminal device of the first and second embodiments.

The first communication unit 404 has a function to generate activation flag to indicate its activation in addition to a function of the first communication unit 104 in FIG. 2. That is, the first communication unit 404 is activated by the electric power supplied from the first power generator 101 or the first power storage 106 and generates the activation flag. The first communication unit 404 also has a function to access to the second communication unit 405 to detect whether the second communication unit 405 generates the activation flag or not.

The second communication unit 405 has a function to generate an activation flag to indicate its activation in addition to a function of the second communication unit 105 in FIG. 2. That is, the second communication unit 405 is activated by the electric power supplied from the second power generator 102 or second power storage 107 and generates the activation flag. The second communication unit 405 also has a function to access to the first communication unit 404 to detect whether the first communication unit 404 generates the activation flag or not.

The memory 408 is connected to the first communication unit 404 and the second communication unit 405, and stores transmission counter indicating send sequence and cumulative value of information value sensed by the sensor 103. The memory 408 is preferably a nonvolatile memory to maintain the stored data without electric power.

(2) Operation of Communication Terminal Device

The operation of the communication terminal device 400 in the present embodiment will be described with reference to FIG. 10. The following operation indicates not only a communication method of the communication terminal device 400, but also a procedure of communication program executed by the communication terminal device 400. These processes are not limited to the order illustrated in FIG. 10.

The order of each process may be changed unless any restriction such that one step uses a result of its previous step.

Figure 10:
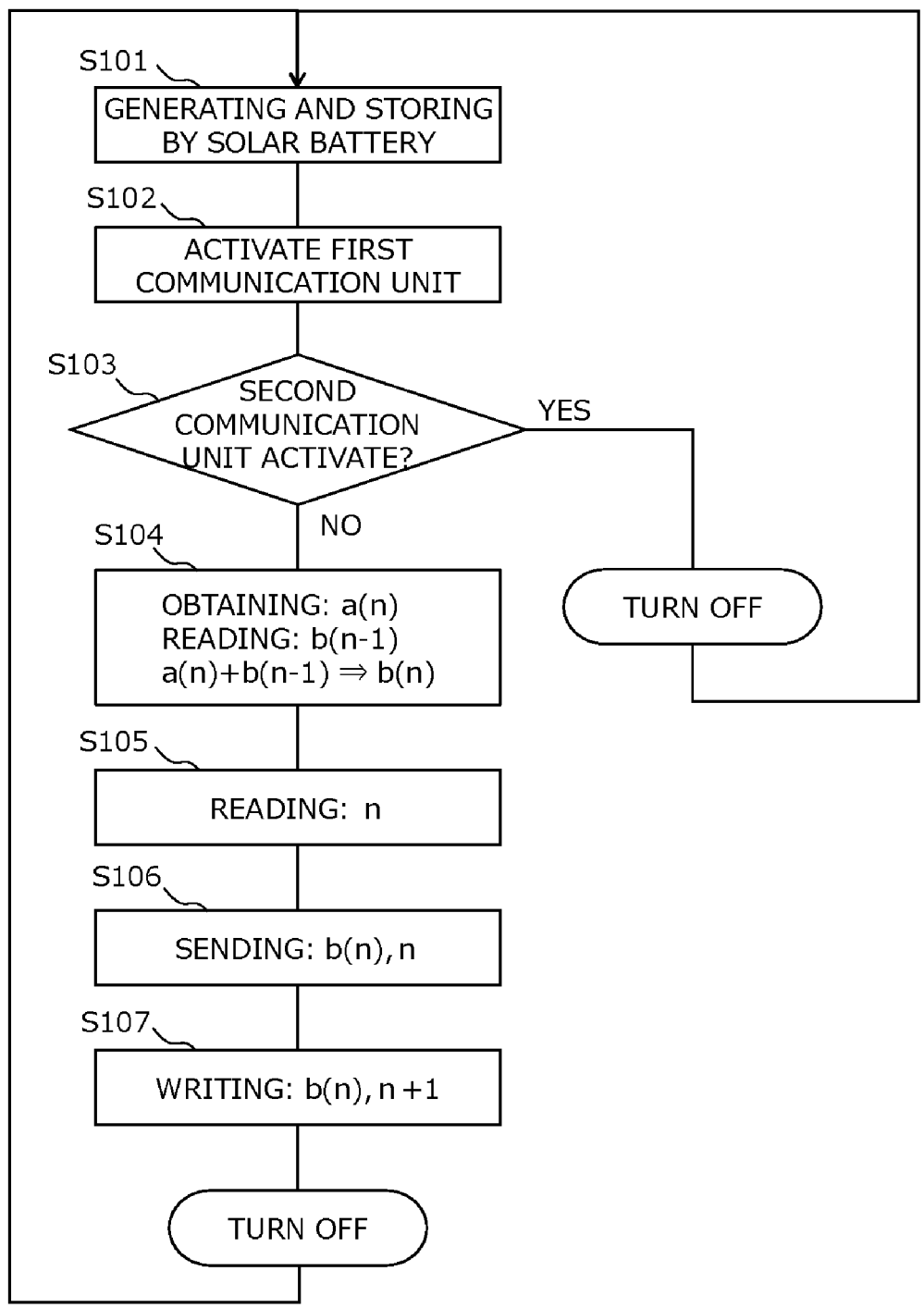
FIG. 10 is a diagram illustrating operations of the communication terminal device in the fourth embodiment.

FIG. 10 illustrates operations of a first module having the first power generator 101, the first power storage 106, and the first communication unit 404, and a second module having the second power generator 102, the second power storage 107, and the second communication unit 405. The operation of the first module is only described as the operations of both modules are the same. Here, a solar battery is used as the first power generator 101, a vibration power generator is used as a second power generator.

The first power storage 106 stores electric power output from a solar battery being the first power generator 101 (S101).

After the first power storage 106 stores predetermined electric power, the first communication unit 404 is activated (S102). Then, the first communication unit 404 generates an activation flag. A trigger for activation of the first communication unit 404 is, for example, sensing of information by the sensor 103.

The first communication unit 404 detects whether the second communication unit 405 is activated or not (S103). Specifically, the first communication unit 404 access to the second communication unit 405 to detect whether the second communication unit 405 generates the activation flag or not.

When the second communication unit 405 is activated (S103: Yes), the first communication unit 404 stops and turns off itself without sending information value sensed by the sensor 103.

When the second communication unit 405 is not activated (S103: No), the first communication unit 404 obtains the information value a(n) sensed by the sensor 103, reads previous cumulative value b(n−1) of the information value stored in the memory 408, and adds these values to generate new cumulative value b(n) of the information value (S104). The first communication unit 404 also reads transmission counter value n stored in the memory 408 (S105).

The first communication unit 404 sends new cumulative value b(n) of the information value and the transmission counter value n (S106).

The first communication unit 404 writes the new cumulative value b(n) of the information value and new transmission counter value n+1 incremented from the transmission counter value n into the memory 408 (S107). Then, the first communication unit 404 turns off itself.

Since the operation of the second module is same as the operation of the first module, the operation of the first module above shall be read as the operation of the second module. However, step S101 shall be read as storing electric power output from the vibration power generator.

In the present embodiment, the exclusive control can be performed so that the first communication unit 404 and the second communication unit 405 will not send the same information.

FIG. 11 illustrates an example of transmission counter value n, cumulative value b(n) of the information value, and information value a(n) when the communication terminal device 400 in FIG. 10 is operated. The transmission counter value n is a value which is incremented from 1 and indicates the transmission order of the information value. The transmission counter value n is used in common with all modules which send information.

The cumulative value b(n) of the information value is a value which is cumulated the information value sensed by the sensor 103 in each transmission phase. In case of FIG. 11, the sensor 103 senses information value 15 in the second transmission. The present information value 15 is added to the previous cumulative value 20 of the information value, then new cumulative value of the information value becomes 35. A merit of using the cumulative value is that the energy value stored in a capacitor can be used as it is. Another merit is that it can sense continuously with lower power consumption without having a concept of sampling period.

It should be noted that the information value may be sent instead of the cumulative value of the information value.

It should be noted that the exclusive control in the present embodiment is one example, it may be performed using any other method. For example, the first communication unit 404 detects the active status of the second communication unit 405 and the second communication unit 405 detects the active status of the first communication unit 404 in this embodiment, however, any control unit (not shown) may detect the activation status of the first communication unit 404 and the second communication unit 405 and control the information transmission function. The activation flags generated by the first communication unit 404 and the second communication unit 405 may be transmitted to an outer server, and the active status may be inquired to the outer server.

(3) Summary of the Fourth Embodiment

In the present embodiment above, two communication units will not send the same information. Therefore, it is not necessary to attach unique identifier to the information, and thus it can restrain increase of data length of the information. Especially, it has a high affinity for LPWA when LPWA is used for the first communication unit since it limits the length of the data.

6. Recapitulation

The Features of the communication terminal device and like in each of the embodiments of the present invention have been described above.

Since the terms used in each embodiment are examples, the terms may be replaced with terms that are synonymous or include synonymous functions.

The block diagram used for the description of the embodiment is obtained by classifying and arranging the configurations of the device for each of the functions. Individual function blocks may be implemented by arbitrarily combining hardware and software. Further, since the block diagram illustrates functions, the block diagram can be understood as disclosure of a method and a program that implements the method.

Function blocks that can be understood as processes, flows, and methods described in the respective embodiments may be changed in order as long as there is no restrictions such as a relationship in which results of preceding other steps are used in one step.

The terms such as first, second, to N-th (where N is an integer) used in each of the embodiments and in the claims are used to distinguish two or more configurations and methods of the same kind and are not intended to limit the order or superiority.

Each of the embodiments provide examples of communication terminal devices attached to farm animals, but the present invention encompasses, unless otherwise limited within the scope of the claims, other dedicated or general-purpose devices other than for farm animals.

INDUSTRIAL APPLICABILITY

The communication terminal device in the present disclosure may be also used as devices hold by human for sending information necessary for games as well as devices attached to farm animals or any objects.

What is claimed is:

1. A communication terminal device comprising:
a first power generator that generates power from one of a first input energy or a first power generation process;
a second power generator that generates power from one of a second input energy different from the first input energy, or a second power generation process, different from the first power generation process;
a sensor for sensing information surrounding the communication terminal device;
a first communication unit for sending the information using electric power supplied from the first power generator;
a second communication unit for sending the information using electric power supplied from the second power generator, the second communication unit performing a communication using a communication scheme different from the first communication unit,
wherein the second communication unit does not send the information when the first communication unit is activated; and
the second communication unit sends the information when the first communication unit is not activated.

2. The communication terminal device according to claim 1, wherein
the first power generator generates power using light as the first input energy; and
the first communication unit performs a communication using a communication scheme capable of long-distance communication more than the second communication unit.

3. The communication terminal device according to claim 2, wherein
the first power generator is a silicon or chemical compound solar battery which generates electric power using sunlight; and
the communication scheme used by the first communication unit is LWPA (Low Power Wide Area).

4. The communication terminal device according to claim 1, wherein
the second power generator generates power other than using light as the second input energy.

5. The communication terminal device according to claim 4, wherein
the second power generator generates power using at least one of vibration, heat, radio wave, or chemical energy as the second input energy; and
the communication scheme used by the second communication unit is Bluetooth™ or BLE (Bluetooth Low Energy).

6. The communication terminal device according to claim 1, wherein
the second power generator generates power using light and generates electric power in a darker surrounding environment than the first power generator.

7. The communication terminal device according to claim 6, wherein
the first power generator is a silicon or chemical compound solar battery which generates electric power using sunlight; and
the second power generator is a dye-sensitized solar battery.

8. The communication terminal device according to claim 1, wherein
the first communication unit does not use electric power supplied from the second power generator; and
the second communication unit does not use electric power supplied from the first power generator.

9. The communication terminal device according to claim 1, wherein
the communication terminal device is held to a back surface of an earmark attached to farm animals.

10. The communication terminal device according to claim 1, wherein
the first power generator generates power using light as the first input energy.

11. A communication terminal device comprising:
a first power generator that generates power from one of a first input energy or a first power generation process;
a second power generator that generates power from one of a second input energy, different from the first input energy, or a second power generation process, different from the first power generation process;
a sensor for sensing information surrounding the communication terminal device;
a first communication unit for sending the information using electric power supplied from the first power generator;
a second communication unit for sending the information using electric power supplied from the second power generator, the second communication unit performing a communication using a communication scheme different from the first communication unit,
wherein when the first communication unit is activated, the first communication unit detects whether the second communication unit is being activated, and when the second communication unit is being activated, activation of the first communication unit is terminated without sending the information.

* * * * *